(12) United States Patent
Brunn

(10) Patent No.: US 12,314,452 B2
(45) Date of Patent: May 27, 2025

(54) DETECTING POSSIBLE SECURITY VIOLATIONS IN AN INTEGRATED CIRCUIT

(71) Applicant: Silicon Laboratories Inc., Austin, TX (US)

(72) Inventor: Brian Taylor Brunn, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 18/521,023

(22) Filed: Nov. 28, 2023

(65) Prior Publication Data

US 2024/0095407 A1 Mar. 21, 2024

Related U.S. Application Data

(62) Division of application No. 17/210,823, filed on Mar. 24, 2021, now Pat. No. 11,886,621.

(51) Int. Cl.
*G06F 21/72* (2013.01)
*G06F 1/08* (2006.01)

(52) U.S. Cl.
CPC .............. *G06F 21/725* (2013.01); *G06F 1/08* (2013.01)

(58) Field of Classification Search
CPC .............. G06F 21/725; G06F 1/08; G06F 1/04
See application file for complete search history.

(56) References Cited

U.S. PATENT DOCUMENTS

| | | | |
|---|---|---|---|
| 10,474,846 B1 | 11/2019 | Rezayee | |
| 11,018,657 B1 | 5/2021 | Sinha | |
| 11,474,130 B2 * | 10/2022 | Lentz | .................. H03K 5/1252 |
| 11,886,621 B2 * | 1/2024 | Brunn | ....................... G06F 1/04 |
| 2009/0066293 A1 * | 3/2009 | Miyanaga | ......... G01R 19/16538 |
| | | | 320/134 |
| 2011/0163736 A1 | 7/2011 | Trimmer | |
| 2017/0357829 A1 | 12/2017 | Park | |
| 2020/0036509 A1 | 1/2020 | Seward, IV | |
| 2021/0165877 A1 | 6/2021 | Yanamadala | |

OTHER PUBLICATIONS

U.S. Appl. No. 17/195,713, filed Mar. 9, 2021, entitled "Clock Generator Circuit for Generating Duty Cycle Clock Signals at Low Power," by Abdulkerim L. Coban.

* cited by examiner

*Primary Examiner* — Baotran N To
(74) *Attorney, Agent, or Firm* — Trop, Pruner & Hu, P.C.

(57) ABSTRACT

In one embodiment, an apparatus includes: a clock generator to receive a reference clock signal and generate a first clock signal using the reference clock signal; a counter coupled to the clock generator to maintain a first count regarding a number of cycles of the first clock signal; and a controller coupled to the counter. The controller may be configured to detect a potential security violation when the first count varies from a predetermined value.

15 Claims, 5 Drawing Sheets

DETECTING POSSIBLE SECURITY VIOLATIONS IN AN INTEGRATED CIRCUIT

CROSS-REFERENCE TO RELATED APPLICATION

The present application is a divisional of U.S. patent application Ser. No. 17/210,823, filed on Mar. 24, 2021, the content of which is hereby incorporated by reference.

BACKGROUND

Integrated circuits are prevalent as components in an ever increasing number of devices of modern life, and have become increasingly sophisticated. In addition, some of these devices use and communicate secure information. Attackers seek to compromise security on such devices and their included integrated circuits. One exploit is for an attacker to deliberately move the locations of clock edges of an external clock that is provided to an integrated circuit. Moving a clock edge can cause a logic failure that may allow a successful security breach.

SUMMARY OF INVENTION

In one aspect, an apparatus includes: a clock generator to receive a reference clock signal and generate a first clock signal using the reference clock signal; a counter coupled to the clock generator, the counter to maintain a first count regarding a number of cycles of the first clock signal; and a controller coupled to the counter, where the controller is to detect a potential security violation when the first count varies from a predetermined value.

In an example, the controller is to detect the potential security violation when the first count varies from the predetermined value by at least a threshold amount. The controller may prevent access to at least a portion of the apparatus in response to the potential security violation. In an example, the controller includes: a security detector to detect the potential security violation; and a security actuator to prevent the access to the at least a portion of the apparatus. The security actuator may prevent access to at least one secure key stored in a non-volatile storage.

In an example, the apparatus further includes an oscillator to generate the reference clock signal, where the oscillator is external to an integrated circuit having the clock generator, the counter and the controller. The controller may detect a manipulation of the reference clock signal by an attacker. The apparatus may further include a detection circuit comprising the clock generator, the counter and the controller. The apparatus further may include a logic circuit coupled to the detection circuit, where the logic circuit comprises a cryptographic circuit and is to operate according to the reference clock signal. The counter may output the first count to the detection circuit in response to a completion of a cycle of the reference clock signal.

In another aspect, a method includes: receiving, in an integrated circuit, a first clock signal; generating a detection clock signal using the first clock signal, the detection clock signal having a higher frequency than the first clock signal; and in response to detecting a glitch in the detection clock signal, identifying a potential security violation in the integrated circuit.

In an example, the method further comprises performing at least one security protection operation in response to identifying the potential security violation. Performing the at least one security protection operation may include shutting down at least a portion of the integrated circuit.

In an example, the method further includes: maintaining a first count based on cycles of the detection clock signal; and outputting the first count in response to completion of a cycle of the first clock signal. Further the method may include: comparing the first count to a predetermined value; and detecting the glitch in response to the first count departing from the predetermined value by at least a threshold amount.

In yet another aspect, an apparatus includes: a process monitor circuit to receive a reference clock signal and generate a first signal using the reference clock signal; a comparator coupled to the process monitor circuit, the comparator to receive the first signal and a reference signal, and output a comparison signal based at least in part on a comparison between the first signal and the reference signal; and a controller coupled to the comparator, where the controller is to detect a potential security violation when the comparison signal departs from an expected range.

In an example, the controller is to prevent access to at least a portion of the apparatus in response to the potential security violation. The controller may include: a security detector to detect the potential security violation; and a security actuator to prevent the access to the at least portion of the apparatus. The security actuator may prevent access to at least one secure key stored in a non-volatile storage.

In one example, the apparatus is an integrated circuit having a radio frequency circuit and at least one digital circuit, the at least one digital circuit comprising cryptographic circuitry to perform cryptographic operations on information using a secure key, where the potential security violation is an indication of a malicious user injecting a glitch into the integrated circuit to seek the secure key.

DETAILED DESCRIPTION

In various embodiments, an integrated circuit (IC) may be provided with security protection to prevent unauthorized tampering with the IC. More specifically, embodiments herein may implement detection circuitry to identify potential security violations in which a malicious user seeks to inject some form of glitch or other anomalous behavior into circuitry of the IC in an effort to obtain sensitive information or cause unwanted behavior.

While various implementations are possible, one particular embodiment described herein provides detection circuitry configured to detect clock glitch violations. Embodiments are not limited in this regard however and in other implementations, other glitches such as supply voltage glitches or so forth can be detected and used to identify a potential security violation. While embodiments may be implemented in many different types of integrated circuits, particular use cases are for so-called Internet of Things (IoT) devices that provide wireless capabilities along with additional functionality. Such IoT wireless-enabled ICs may include one or more radios that may operate independently, potentially concurrently, at different radio bands. Such ICs may routinely be adapted into IoT devices that can be implemented as small low power autonomous unattended devices that may be placed in service and expected to operate seamlessly over a number of years.

Figure 1:
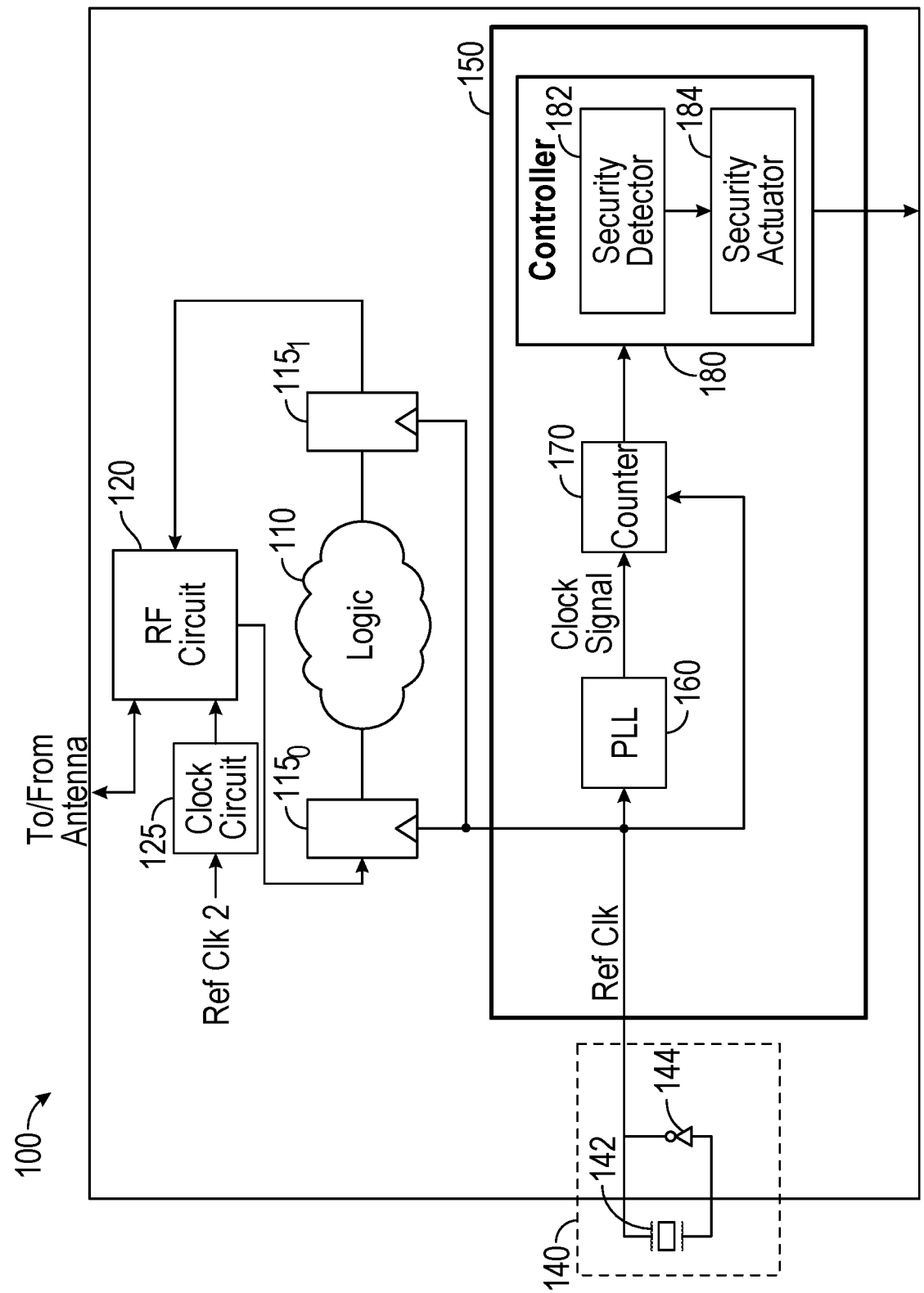
FIG. 1 is a block diagram of an apparatus in accordance with one embodiment.

Referring now to FIG. 1, shown is a block diagram of an apparatus in accordance with one embodiment. More specifically as shown in FIG. 1, apparatus 100 may take the form of an integrated circuit including one or more semiconductor dies to provide desired functionality. In the embodiment shown, apparatus 100 may be implemented as a wireless-enabled IC that includes a radio frequency (RF) circuit 120 to wirelessly communicate with various entities. In general, RF circuit 120 includes analog front end circuitry to receive incoming RF signals from an antenna, process and downconvert them to lower frequency signals for further processing. To this end, a clock circuit 125, which may include a phase lock loop, local oscillator or so forth, may receive a reference clock signal and generate a mixing signal used for downconversion (and upconversion operations). In turn, RF circuit 120 may communicate digitized signals (directly or indirectly) with a logic circuit 110, which may represent various functionality.

While in the abstract, logic circuit 110 may be any digital circuitry to perform desired operations, for purposes of discussing embodiments herein, assume that logic circuit 110 is a cryptographic engine to perform encryption/decryption operations. In particular embodiments, logic circuit 110 may be implemented as custom hardware, designed by a designer of the IC. Such cryptographic operations may be performed using at least in part one or more cryptographic keys, which may be securely stored within a non-volatile storage of the integrated circuit. One such key may be a designer-implemented key, also referred to herein as a universal key, that is common to all ICs of a particular stock keeping unit (SKU). As will be described herein, embodiments may be used to detect a potential security violation, such that compromise of this universal key can be prevented.

While in certain implementations, logic circuit 110 may be implemented as a dedicated and/or custom hardware, embodiments are not limited in this regard and in other cases, logic circuit 110 may include general-purpose processing circuitry such as a microcontroller or other such processing circuitry that is configured to execute instructions for one or more desired functions. As examples, logic circuit 110 may be configured to perform functions related to sensing operations, monitoring operations, processing operations or so forth.

In general, logic circuit 110 may operate in a digital domain according to a digital clock signal. In various implementations, this digital clock signal may be received from different sources both on-chip and off-chip. In particular embodiments, logic circuit 110, along with other digital circuitry of the IC may receive a digital clock signal that is provided via an oscillator circuit 140, implemented with an off-chip source (namely an off-chip crystal 142) and on-chip oscillator circuitry represented as an inverter 144. In one embodiment, the reference clock signal may be at a frequency of 40 MHz; of course other examples are possible.

Still with reference to FIG. 1, note that an incoming data path to logic circuit 110 is generically shown as being received from a first latch circuit 115₀, which may be implemented as a flip flop circuit that receives an incoming reference clock signal and provides incoming data (received from a source circuit not shown in FIG. 1) to logic circuit 110. And in turn, logic circuit 110 outputs processed data to another latch circuit 115₁, which in turn may output information to RF circuit 120 for transmission via the antenna (or to another destination circuit not shown in FIG. 1). In an implementation herein in which logic circuit 110 is configured for cryptographic operations, there may be a predetermined latency incurred by such operations within logic circuit 110. A malicious user may learn this latency and use this information in part to seek to obtain secure information such as one or more cryptographic keys. Such secure key(s) may include a universal key common to a given SKU of the IC. Once obtained by a malicious user, this key can be used to compromise the ICs of the SKU that are present in various use cases in the field, at least until the attack is detected, new keys generated and provided to all deployed ICs, which is a time-consuming and expensive process.

In an effort to initiate a security attack on apparatus 100, a malicious actor may seek to modify the reference clock signal, which in turn may modify operation within logic circuit 110 in a manner that could lead to a security exploit. This malicious actor may be a hacker having free access to the IC, e.g., in a lab setting to be able to inject glitches into the device.

Embodiments may guard against such attacks and compromises, avoiding the need for such extensive and disruptive field updates. To this end, embodiments include a detection circuit 150 that is configured to detect such attacks. More particularly in embodiments, detection circuit 150 may be configured to detect anomalies in the incoming reference clock signal. As shown, the reference clock signal may be provided to a phase locked loop (PLL) 160, which may be configured as a frequency multiplier to provide a multiplication of the incoming reference clock signal to a higher frequency signal. Although embodiments are not limited in this regard, PLL 160 may be implemented as a 20× frequency multiplier, such that the clock signal output by PLL 160 has a higher frequency than the incoming clock signal by a factor of 20. Of course embodiments are not limited to this example. Continuing with the above example, assuming an input reference clock signal that is at 40 MHz, PLL 160 may generate a resulting clock signal, namely a generated clock signal, at 800 MHz.

Still with reference to FIG. 1, detection circuit 150 further includes a counter 170 that receives this generated clock signal, as well as the original reference clock signal. In embodiments, counter 170 may be configured to count the number of generated clock signals received per cycle of the reference clock signal. In this way, counter 170 may generate an output count signal that is representative of the number of generated clock signal cycles per cycle of the reference clock signal. Continuing with the above example, when the reference clock signal is received in its normal manner, counter 170 may output a count of 20 per each cycle of the reference clock signal. Instead when an anomaly condition is present in the received reference clock signal, counter 170 may output a different count value, e.g., 19 or 21, or any other value. While different logic may set different thresholds on what is considered acceptable variance, embodiments may identify a glitch when the count value departs from an expected count value by one or more, continuing with the above example. This is so, as a variance of 1 would indicate a glitch that may be highly indicative of a intentional glitch. This is so, as a typical crystal or other oscillator that generates reference clock signal may have errors that are on the order of less than approximately 100 parts per million (PPM).

Still with reference to FIG. 1, detection circuit 150 also includes a controller 180. In different implementations, controller 180 may be implemented as a dedicated microcontroller within detection circuit 150. In other cases, controller 180 may be implemented as part of a programmable controller and in some instances can be implemented within logic circuit 110.

As shown, controller 180 includes a security detector 182 and a security actuator 184. In embodiments herein, security detector 182 may be configured to detect a potential security violation when the received count value from counter 170 departs from a predetermined value, e.g., by at least a threshold amount. For example, in some cases security detector 182 may be configured to detect a possible security violation when the count value is 19 or less or 21 or greater, continuing with the example described above.

On detection of a potential security violation, security detector 182 may send a detection signal to security actuator 184. In embodiments herein, security actuator 184 may perform one or more actions in response to this detection signal. For example, in some cases security actuator 184 may be configured to issue a security violation signal in response to the detection. In turn, the security violation signal may cause apparatus 100, e.g., the IC or at least certain functionality of the IC, to be shut down. Of course other responses to possible security violations may, in addition or alternatively, occur. Such responses can include restricting access to at least a portion of the IC (e.g., a storage that stores security keys or other sensitive information), a logging function, a reporting function, combinations thereof, or so forth. Understand while shown at this high level in the embodiment of FIG. 1, many variations and alternatives are possible.

Figure 2:
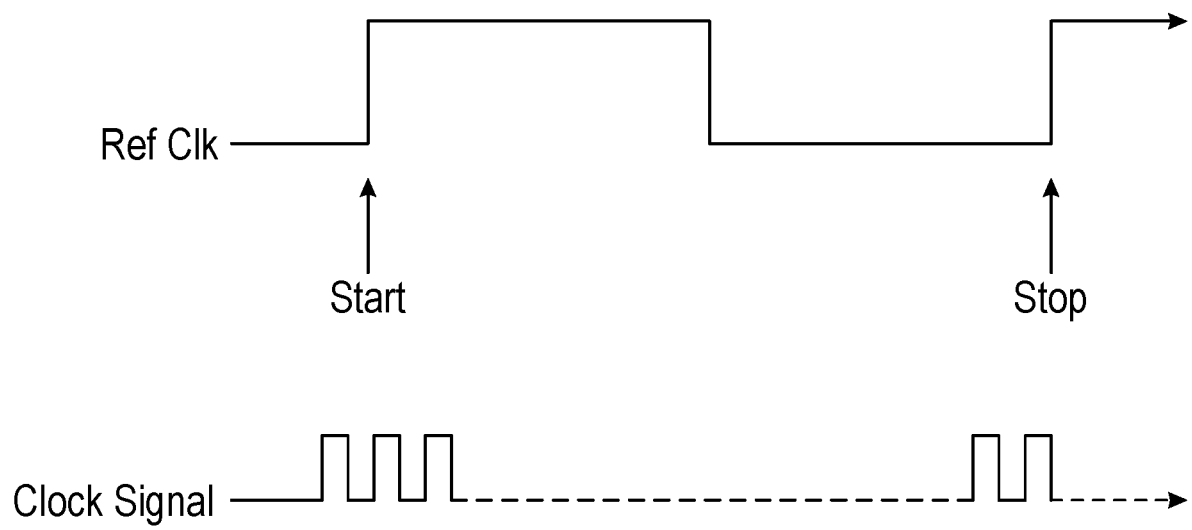
FIG. 2 is a timing diagram of a security detection process in accordance with an embodiment.

Referring now to FIG. 2, shown is a timing diagram of a security detection process in accordance with an embodiment. As shown in FIG. 2, an incoming reference clock signal (Ref Clk) may be received that has given parameters, e.g., waveform shape and frequency. In the embodiment shown, a square wave reference clock signal is received. Shown in FIG. 2 is a full cycle beginning on a rising edge of this clock signal at a start point, and concluding at a stop point on the next rising edge.

Also shown in FIG. 2 is a generated clock signal that may be generated, e.g., in the multiplying PLL, using this reference clock signal. As shown, the generated clock signal (Clock Signal) has the same waveform shape (e.g., square wave) but is at a higher frequency. Following the above example, assume that this generated clock signal is generated at 20 times the frequency of the incoming clock signal. Accordingly, in a single cycle of the reference clock signal, there may be 20 cycles of the generated clock signal. Thus when this signal is provided to a detection circuit, for a single reference clock signal cycle there may be 20 generated clock signal cycles. Of course, other counting mechanisms may be used, such as where a half cycle (e.g., rising edge to falling edge) of the reference clock signal is used for comparison to a given number of the generated clock signals.

While the above discussion focuses on an implementation in which a clock glitch is detected, other possibilities, including detecting a possible attack by way of another clock-based or other glitch may occur in other manners. For example, an incoming clock signal, e.g., an off-chip clock signal, can be provided to some type of circuitry that acts as a process monitor which, when provided with a modified incoming clock signal, leads to potentially anomalous operation.

Figure 3:
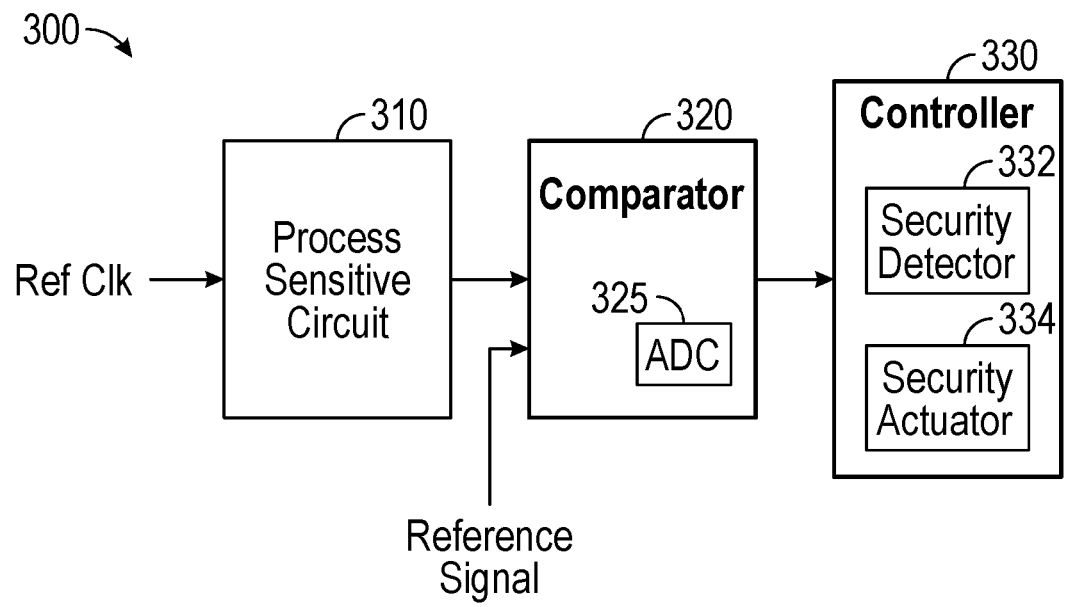
FIG. 3 is a block diagram of an apparatus in accordance with another embodiment.

Referring now to FIG. 3, shown is a block diagram of an apparatus in accordance with another embodiment. In the embodiment shown, a process sensitive circuit 310 may be implemented as a charge integrator as one example. In such an embodiment, the reference clock signal may be used to control a switching speed of a capacitance of process sensitive circuit 310, such that a variable voltage is output from process sensitive circuit 310. This voltage signal in turn is provided to a comparator 320 which may include an analog-to-digital converter (ADC) 325.

As further shown, a reference signal, e.g., a reference voltage signal, also is provided to comparator 320. Based on a result of the comparison (which may occur in an operational amplifier), a resulting comparison voltage is obtained. This comparison voltage is converted to a digital voltage in ADC 325 and is provided as a digital value to a controller 330.

In an embodiment, controller 330 may be configured as discussed above with regard to controller 180 of FIG. 1, with an included security detector 332 and security actuator 334. More particularly in this implementation, the incoming digital value may, in the absence of an attack, be within a predetermined legal range. If instead the digital value is received outside of this range, security detector 332 may identify a potential security violation, and security actuator 334 may take a given action, as described above. Understand while shown at this high level in the embodiment of FIG. 3, many variations and alternatives are possible.

Figure 4:
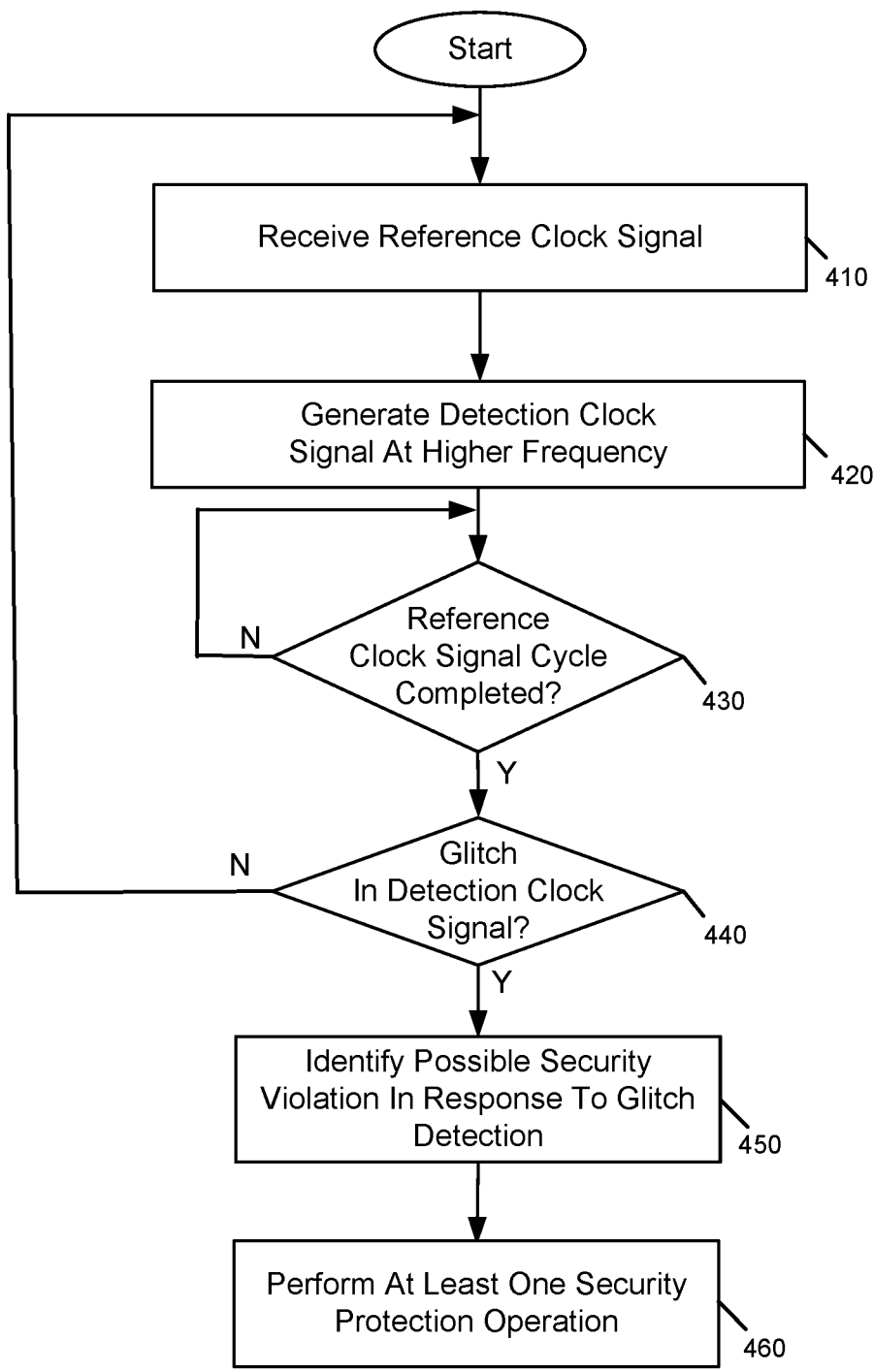
FIG. 4 is a flow diagram of a method in accordance with an embodiment.

Referring now to FIG. 4, shown is a flow diagram of a method in accordance with an embodiment. As shown in FIG. 4, method 400 is a method for detecting a potential security violation based on clock glitching. In an embodiment, method 400 may be performed in a detection circuit, such as hardware circuitry, firmware and/or software, or combinations thereof.

As illustrated, method 400 begins by receiving a reference clock signal (block 410). Such reference clock signal may be received from an off-chip source. Next at block 420 a detection or generated clock signal may be generated at a higher frequency. Then it may be determined at diamond 430 whether the reference clock signal cycle has completed. Understand while this example shows a cycle-based operation, analysis may be based on a half cycle or other period in other embodiments.

Still with reference to FIG. 4, when it is determined that the reference clock signal cycle has completed, control passes to diamond 440 to determine whether a glitch is detected in the detection clock signal. As discussed above, this glitch detection may be based on a count value that varies from an expected value, e.g., by a threshold level. If so, control passes to block 450 where a possible security violation may be identified in response to this glitch detection. Then at block 460 at least one security protection operation may be performed. This operation may be shutting down of an entire integrated circuit, restricting access, e.g., to secure information, communicating the potential security violation to a remote source such as a designer of the IC or so forth (or combinations thereof). Although shown at this high level in the embodiment of FIG. 4, many variations and alternatives are possible.

Figure 5:
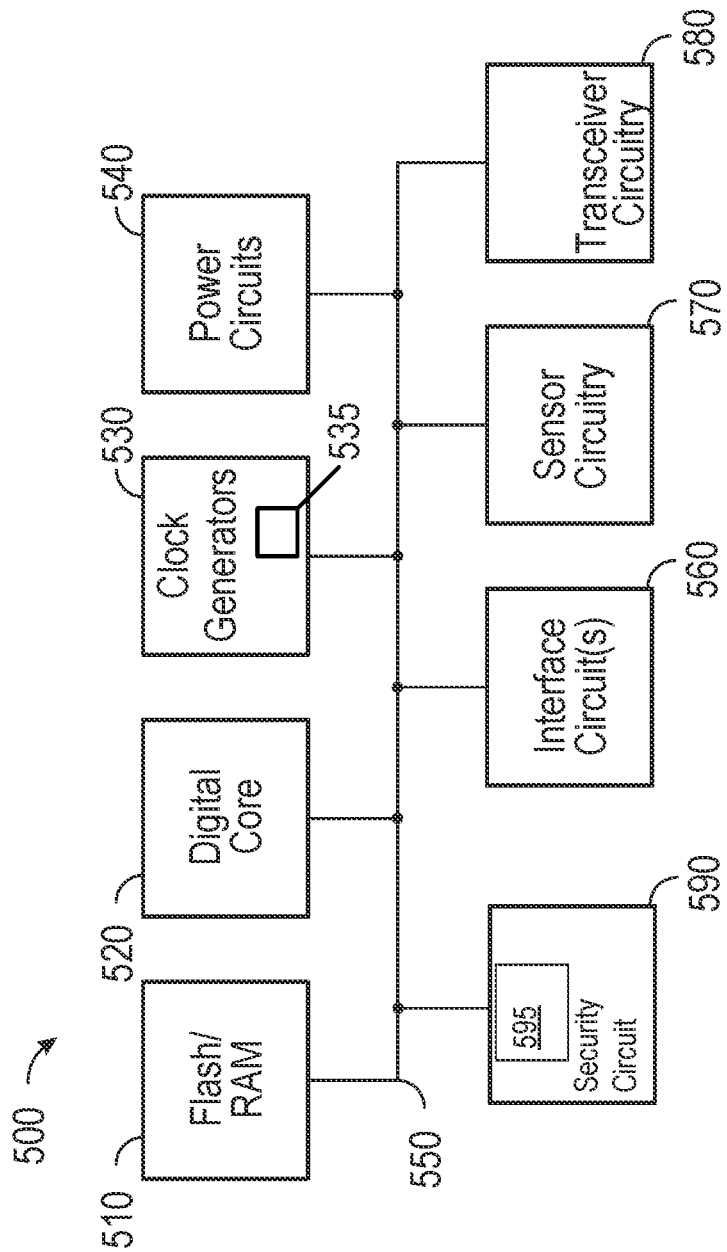
FIG. 5 is a block diagram of a representative integrated circuit in accordance with an embodiment.

Referring now to FIG. 5, shown is a block diagram of a representative integrated circuit 500 which may include clock generator circuitry as described herein. In the embodiment shown in FIG. 5, integrated circuit 500 may be, e.g., a microcontroller, wireless transceiver or other device that can be used in a variety of use cases, including sensing, metering, monitoring, embedded applications, communications, applications and so forth, and which may be particularly adapted for use in an IoT device.

In the embodiment shown, integrated circuit 500 includes a memory system 510 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for controlling the security detection operations described herein, and data including one or more secure keys.

Memory system 510 couples via a bus 550 to a digital core 520, which may include one or more cores and/or microcontrollers that act as a main processing unit of the integrated circuit. In turn, digital core 520 may couple to clock generators 530 which may provide one or more phase locked loops or other clock generator circuitry to generate various clocks for use by circuitry of the IC. As shown, clock generators 530 may include a clock generator 535, which may generate a detection clock signal by multiplying an incoming clock signal as described herein.

As further illustrated, IC 500 further includes power circuitry 540, which may include one or more voltage regulators. Additional circuitry may optionally be present depending on particular implementation to provide various functionality and interaction with external devices. Such circuitry may include interface circuitry 560 which may provide interface with various off-chip devices, sensor circuitry 570 which may include various on-chip sensors including digital and analog sensors to sense desired signals, such as for a metering application or so forth.

In addition as shown in FIG. 5, transceiver circuitry 580 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As further shown, a security circuit 590 may be present including cryptographic circuitry and a detection circuit 595 such as described herein. Understand while shown with this high level view, many variations and alternatives are possible.

Note that ICs such as described herein may be implemented in a variety of different devices such as IoT device. This IoT device may be a smart utility meter for use in a smart utility network or a home automation device for use in a home automation network, e.g., a mesh network in which communication is according to an IEEE 802.15.4 specification.

Figure 6:
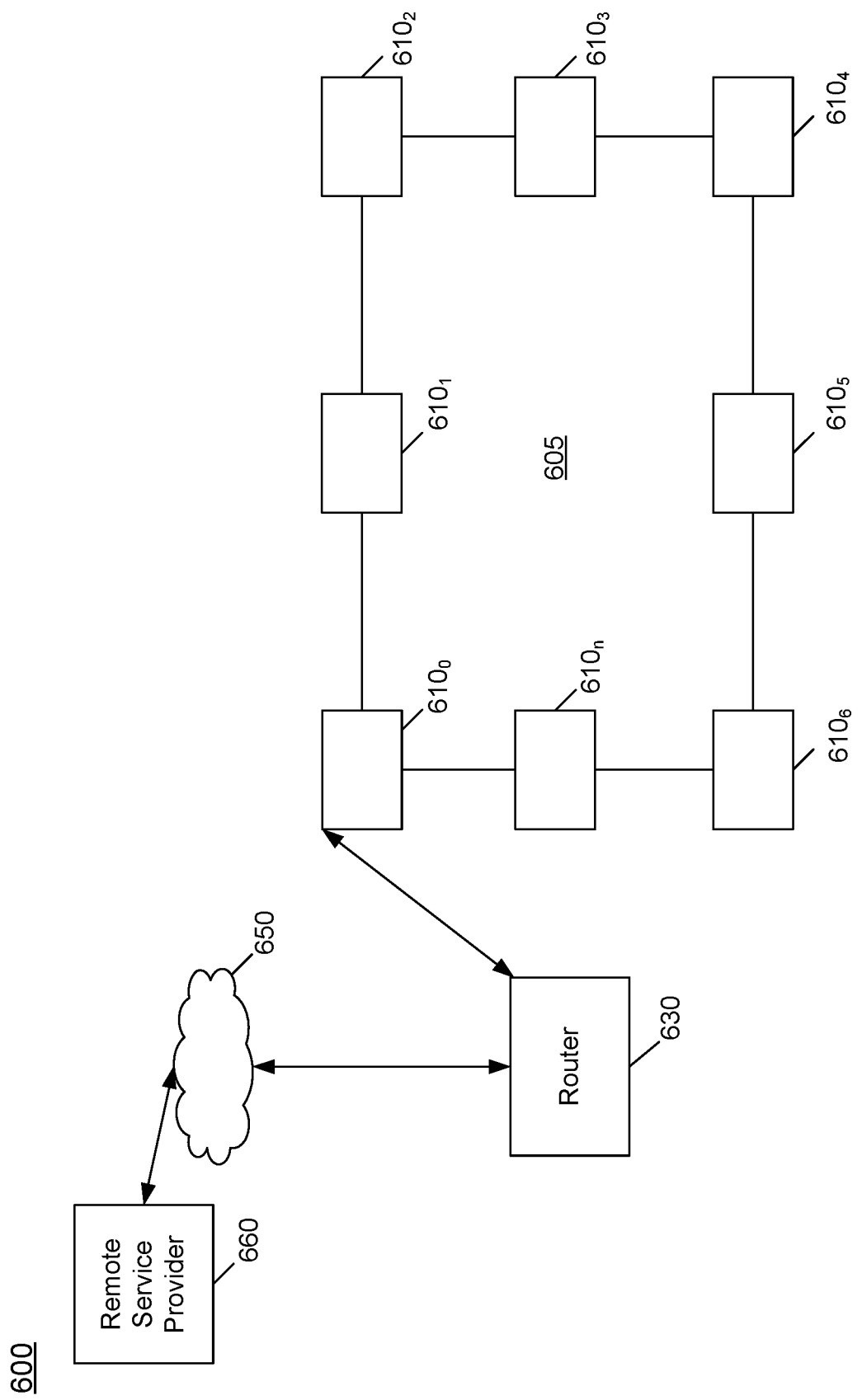
FIG. 6 is a high level diagram of a network in accordance with an embodiment.

Referring now to FIG. 6, shown is a high level diagram of a network in accordance with an embodiment. As shown in FIG. 6, a network 600 includes a variety of devices, including smart devices such as IoT devices, routers and remote service providers. In the embodiment of FIG. 6, a mesh network 605 may be present, e.g., in a neighborhood having multiple IoT devices 6100-*n*. Such IoT devices may include detection circuitry to detect possible security violations as described herein. As shown, at least one IoT device 610 couples to a router 630 that in turn communicates with a remote service provider 660 via a wide area network 650, e.g., the internet. In an embodiment, remote service provider 660 may be a backend server of a utility that handles communication with IoT devices 610. Understand while shown at this high level in the embodiment of FIG. 6, many variations and alternatives are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a process monitor circuit to receive a reference clock signal and generate a first signal using the reference clock signal;
   a comparator coupled to the process monitor circuit, the comparator to receive the first signal and a reference signal, and output a comparison signal based at least in part on a comparison between the first signal and the reference signal; and
   a controller coupled to the comparator, wherein the controller is to detect a potential security violation when the comparison signal departs from an expected range.

2. The apparatus of claim 1, wherein the controller is to prevent access to at least a portion of the apparatus in response to the potential security violation.

3. The apparatus of claim 2, wherein the controller comprises:
   a security detector to detect the potential security violation; and
   a security actuator to prevent the access to the at least portion of the apparatus.

4. The apparatus of claim 3, wherein the security actuator is to prevent access to at least one secure key stored in a non-volatile storage.

5. The apparatus of claim 3, wherein the apparatus comprises an integrated circuit having a radio frequency circuit and at least one digital circuit, the at least one digital circuit comprising cryptographic circuitry to perform cryptographic operations on information using a secure key, wherein the potential security violation is an indication of a malicious user injecting a glitch into the integrated circuit to seek the secure key.

6. A wireless device comprising:
   an antenna;
   an integrated circuit coupled to the antenna, the integrated circuit comprising:
      at least one transceiver to process radio frequency (RF) signals of at least one wireless communication protocol;
      a process monitor circuit having capacitor circuitry, the process monitor circuit to receive a reference clock signal to control a switching speed of a capacitance of the capacitor circuitry and generate a first voltage based on the reference clock signal;
      a comparator coupled to the process monitor circuit, the comparator to receive the first voltage and a reference voltage, and output a comparison signal based at least in part on a comparison between the first voltage and the reference voltage; and
      a controller coupled to the comparator, wherein the controller is to detect a potential security violation when the comparison signal departs from an expected range.

7. The wireless device of claim 6, wherein the controller comprises:
   a security detector to detect the potential security violation; and a security actuator to prevent access to at least a portion of the wireless device in response to the potential security violation.

8. The wireless device of claim 6, further comprising at least one digital circuit, the at least one digital circuit comprising cryptographic circuitry to perform cryptographic operations on information using a secure key, wherein the potential security violation is an indication of a malicious user injecting a glitch into the integrated circuit to seek the secure key.

9. The wireless device of claim 8, further comprising a non-volatile storage to store the secure key, the secure key comprising a universal key common to a given stock keeping unit of the integrated circuit.

10. The wireless device of claim 6, wherein the process monitor circuit comprises a charge integrator.

11. The apparatus of claim 1, wherein the process monitor circuit is to generate the first signal having a voltage based on the reference clock signal, and wherein the comparator is to compare the voltage of the first signal to a voltage of the reference signal.

12. An integrated circuit comprising:
a process sensitive circuit to receive a reference clock signal from an off-chip source and generate a first voltage signal based at least in part on the reference clock signal;
a comparator coupled to the process sensitive circuit, the comparator to compare the first voltage signal to a reference voltage signal, and output a comparison signal based at least in part on the comparison; and
a controller coupled to the comparator, wherein the controller is to detect a potential security violation when the comparison signal departs from an expected range.

13. The integrated circuit of claim 12, wherein the process sensitive circuit comprises capacitor circuitry having a switching speed based at least in part on the reference clock signal.

14. The integrated circuit of claim 12, wherein in response to the potential security violation, the controller is to prevent access to a non-volatile storage comprising at least one secure key.

15. The integrated circuit of claim 12, wherein the controller is to detect the potential security violation when a malicious user modifies the reference clock signal.

* * * * *